(12) United States Patent
Hiss (10) Patent No.: US 8,505,983 B2
(45) Date of Patent: Aug. 13, 2013

(54) EXPANSION SEAL, ESPECIALLY FOR GASES

(76) Inventor: Ludwig Hiss, Endingen (DE)

( * ) Notice: Subject to any disclaimer, the term of this patent is extended or adjusted under 35 U.S.C. 154(b) by 262 days.

(21) Appl. No.: 12/739,964

(22) PCT Filed: Oct. 29, 2008

(86) PCT No.: PCT/EP2008/009125
§ 371 (c)(1),
(2), (4) Date: Jul. 1, 2011

(87) PCT Pub. No.: WO2009/056290
PCT Pub. Date: May 7, 2009

(65) Prior Publication Data
US 2011/0253667 A1    Oct. 20, 2011

(30) Foreign Application Priority Data

Oct. 29, 2007  (DE) .................. 10 2007 051 921
Nov. 30, 2007  (DE) .................. 10 2007 058 126

(51) Int. Cl.
*F16L 23/00* (2006.01)

(52) U.S. Cl.
USPC .......................................... 285/368; 277/612

(58) Field of Classification Search
USPC ............. 285/368, 363, 364, 365, 366, 367; 215/294, 355, 364, 45, 349, 350; 277/612, 277/615, 626, 644, 647
See application file for complete search history.

(56) References Cited

U.S. PATENT DOCUMENTS

| | | | | | |
|---|---|---|---|---|---|
| 584,385 | A | * | 6/1897 | Malepart | 215/364 |
| 605,908 | A | * | 6/1898 | Perry | 215/364 |
| 622,534 | A | * | 4/1899 | Preschlin | 285/368 |
| 700,043 | A | * | 5/1902 | Heard | 215/364 |
| 1,146,036 | A | * | 7/1915 | Spinks | 215/364 |
| 1,416,278 | A | * | 5/1922 | Furman | 215/364 |
| 1,493,501 | A | * | 5/1924 | Rice | 215/364 |
| 1,514,052 | A | * | 11/1924 | Kaiser | 285/363 |
| 1,607,943 | A | * | 11/1926 | Carson et al. | 285/367 |
| 1,866,160 | A | | 7/1932 | Griswold, Jr. | |
| 1,926,107 | A | * | 9/1933 | Morehead | 285/368 |

(Continued)

FOREIGN PATENT DOCUMENTS

| | | |
|---|---|---|
| CA | 698130 | 11/1964 |
| CH | 422 448 | 10/1966 |

(Continued)

*Primary Examiner* — David E Bochna
(74) *Attorney, Agent, or Firm* — Gudrun E. Huckett (57) ABSTRACT

A flange connection for connecting e.g. two sections of a tube or pipe comprises two flanges and a sealing ring inserted into an annular sealing space defined by radial faces and axially extending peripheral walls between the flanges. The sealing ring has an annular main body and an outer periphery with a cross-sectional shape that has legs extending outwardly from the main body. These legs, in a condition prior to application of sealing pressure, are inclined away from each other and have rounded outer ends that abut both the radial faces and the peripheral walls defining the annular sealing space. The legs, in a condition where the flanges are forced against each other, are axially compressed and upset at least in a radial direction by plastic flow of material on the outer ends in sealing engagement with the axially extending peripheral walls. Preferably, the sealing ring is formed with an annular shoulder that extends radially outwardly from an outer peripheral area of the main body and that is centrally located between the legs.

7 Claims, 5 Drawing Sheets

(56) References Cited

U.S. PATENT DOCUMENTS

| | | | | |
|---|---|---|---|---|
| 1,965,273 A | * | 7/1934 | Wilson | 285/363 |
| 2,022,989 A | * | 12/1935 | Tilman | 215/355 |
| 2,292,149 A | * | 8/1942 | Moeller | 215/364 |
| 2,533,868 A | * | 12/1950 | Anderson | 285/363 |
| 2,760,673 A | | 8/1956 | Laurent | |
| 2,913,261 A | * | 11/1959 | Matchett | 285/363 |
| 2,921,608 A | | 1/1960 | Crawford et al. | |
| 3,038,731 A | | 6/1962 | Milleron | |
| 3,115,981 A | * | 12/1963 | Darmstadt et al. | 215/364 |
| 3,208,758 A | | 9/1965 | Carlson et al. | |
| 3,239,245 A | * | 3/1966 | Press et al. | 285/354 |
| 3,307,861 A | | 3/1967 | Adam et al. | |
| 3,333,723 A | | 8/1967 | Wisman | |
| 4,142,940 A | * | 3/1979 | Modolell et al. | 215/364 |
| 4,193,617 A | | 3/1980 | Hitz | |
| 4,361,331 A | * | 11/1982 | Kohler | 285/363 |
| 4,747,606 A | * | 5/1988 | Jennings | 277/612 |
| 5,109,997 A | * | 5/1992 | Phillips | 215/364 |
| 5,640,751 A | | 6/1997 | Faria | |
| 6,168,036 B1 | * | 1/2001 | Teng | 215/364 |
| 6,241,254 B1 | * | 6/2001 | Gromyko et al. | 285/368 |

FOREIGN PATENT DOCUMENTS

| | | |
|---|---|---|
| DE | 1 228 871 | 11/1966 |
| DE | 1 425 429 | 11/1969 |
| DE | 24 16 808 A1 | 10/1975 |
| EP | 0 241 350 A1 | 10/1987 |
| EP | 0 711 938 A1 | 5/1996 |
| EP | 1 394 450 A1 | 3/2004 |
| EP | 1 909 000 A1 | 4/2008 |
| FR | 825 672 | 3/1938 |
| FR | 1 044 153 A | 11/1953 |
| FR | 1 506 567 A | 12/1967 |
| FR | 1 537 146 A | 8/1968 |
| FR | 1 563 153 A | 4/1969 |
| GB | 2 038 972 A | 7/1980 |
| WO | WO-2006/089711 A1 | 8/2006 |
| WO | WO-2007/044201 A1 | 4/2007 |

* cited by examiner

EXPANSION SEAL, ESPECIALLY FOR GASES

CROSS-REFERENCES TO RELATED APPLICATIONS

This application is a national stage application of international application No. PCT/EP08/09125 filed Oct. 29, 2008.

FIELD OF THE INVENTION

The invention relates to an expansion seal and to a flange connection using n expansion seal.

BACKGROUND OF THE INVENTION

The EP application 07 019 555.7 describes a sealing device for pipes, which contains correspondingly flexible soft metals or soft metal alloys such as tin, lead, indium, gold, copper, aluminum, in particular metal alloys with a Mohs hardness between 1 and 3 as sealing compound, and methods for the manufacture and use thereof, which can be used in pipes or bodies to be sealed of similar type and construction, in particular instead of seals of elastomeric and/or polymeric materials.

In particular, said application relates to a novel and highly effective arrangement of the sealing elements which provide for a substantial improvement of the tightness of sealing systems in particular with respect to volatile media such as hydrogen and helium.

The advantage of such seal consists in a substantial reduction of the diffusion of extraneous substances, i.e., gases with an extremely low molecular weight, through the sealing region, and as compared to plastic seals in achieving very much better tightness values by using flexible, soft metals or metal alloys as sealing material.

In the ideal case, a sufficient tightness between two surfaces could also be achieved without the aid of sealing materials. For this purpose, however, the surfaces to be sealed should have a smooth surface not achievable in practice, or the force which urges the surfaces to be sealed against each other would have to be so great that all cavities still present between the sealing surfaces are leveled out by material flow to such an extent that the molecules of the medium to be sealed no longer can pass through the resulting boundary zones between the sealing surfaces, because their distance from each other generally is smaller than the effective molecule diameter of the gas. Experiments have shown that at such a high pressure, the boundary surfaces are deformed non-uniformly, so that they can no longer be sealed after demounting the flanges.

It is state of the art to insert a soft sealing material between the surfaces to be sealed, which upon compression of the assembly can easily and flexibly be pressed onto the sealing surfaces and into the existing cavities between the surfaces to be sealed.

A standard state of the art product are the well-known O-rings, which generally can be made of elastomer and polymer plastics, but also of soft metal. Up to now, it has been regarded as essential that the sealing material has a lower Mohs hardness than the flanges.

Understandably, the sealing of connections of pipes with flanges under high pressure or high vacuum creates particular difficulties when the medium to be sealed is hydrogen or helium, since both elements have the smallest possible molecule diameter of all volatile substances and thus also can escape through smallest leaks in the case of pressure differences. In the case of hydrogen, the known phenomenon of metal penetration should also be considered in dimensioning the sealing systems.

The described problems have long since been studied intensively and a wide variety of suggestions have been made to optimize the sealing behavior especially of flange connections of pipes.

Most of the developments of high-vacuum or high-pressure technology are based on a form of flange connection for high-vacuum systems with the above-described O-rings which is known for more than 40 years. However, the sealing properties of said O-rings with respect to e.g., helium are worse than those of metal seals at least by a factor of $10^{-6}$.

In the U.S. Pat. No. 3,208,758 copper is used as soft metal in the form of flat sealing disks, which are inserted between identical flanges such that their protruding ridge member generates an increased sealing pressure upon compression of the flanges due to a resulting inclined surface (cf. U.S. Pat. No. 5,640.751, Col. 1, lines 8-18 and Swiss Patent No. 422 448). This type of sealing was improved by a different design of the soft metal such that the above-described ring seal can be replaced by seals with virtually any surface (U.S. Pat. No. 5,640.751, Col. 2, lines 34-38).

A further approach to the improvement of sealing properties is described in GB-A 2,038,972. Here as well, bevels and grooves which upon compression of the parts to be sealed are partly filled with sealing compound or penetrate into the same are intended to increase the effective pressure in the sealing surface exposed to a vertical relative movement and thus produce a higher tightness. A disadvantage of this configuration is the difficult separation of such compounds, for instance during maintenance work (cf. p. 1, lines 31-37 in conjunction with p. 1, lines 100-104).

In U.S. Pat. No. 2,760,673 an attempt is made to achieve the sealing properties by at least two O-rings with wedge-shaped cross-section (FIGS. 1, 17 and 18). For the specific increase in pressure between the O-rings, a correspondingly equipped channel (20, 20a) is required here, which unnecessarily complicates the sealing mechanism and in practice would rather lead to undesired leakages, which likewise question the advantage of such a changed sealing surface especially in the case of highly volatile gases such as helium (Col. 1, lines 56-64), The FR Patent No 1,044.153 describes a kind of double-wailed Dewar vessel with an inner copper tank, which should be used as autoclave for high-pressure reactions e.g., in liquid oxygen. By means of wedge-shaped parts of the sealing ring (FIGS. 1, 3a) a particular pressure resistance in the case of sudden changes in temperature is achieved (p. 2, Col. 1, penultimate and last sentence) and at the same time is said to very much facilitate the opening and closing of the vessel. An improvement of the sealing quality when using soft metal sealing material is not described.

The FR Patent No. 1,506,567 describes a lens-shaped soft metal seal, in which in the case of vertical compression the pressure acting on the thicker center piece of the horizontally applied sealing disk should generate an increased transverse pressure by leveling out the central bulge to improve edge sealing (Col. 2, para. 1-3).

A further metal seal is described in DE-A 24 16 808 for vacuum purposes. For easier handling only two sealing rings (a sealing ring and a centering ring) here substantially are combined with each other such that the sealing connection can be separated again in a particularly easy way. Even in the case of a great deformation, only the sealing ring must then be replaced, and the centering ring can be used as often as desired (p. 2, para. 2 and 3).

In DAS 1 228 871 a sealing arrangement for high-vacuum flange connections is described, in which the sealing ring of soft metal fills a cavity formed of two opposed grooves, when the two flanges are compressed. In FIGS. 1 and 3 it is shown that by designing the cavity with sharp teeth and bevels of the walls a particular shape is intended. The alleged advantages of this arrangement are described in Col. 3, lines 30-47 and hardly relate to an improvement of the tightness.

The U.S. Pat. No. 3,038,731 likewise relates to soft metal seals for achieving a high vacuum in vessels or conduits made of copper, brass, stainless steel, nickel, molybdenum, tungsten, tantalum, glass and synthetic MICA silicate, whose tightness is improved by liquefying the bearing surface of the sealant under pressure. Gallium, tin, indium, bismuth and lead and the alloys thereof above all are proposed as sealant. Liquefaction is achieved by soldering or directly applying the liquid sealant (Col. 2, lines 50-62). A particular material-related thickness of the sealing layer should be ensured, which in particular in the case of alloys is adjustable in accordance with the invention (Table I). A particular shape of the seals is not important here, but the application thereof is very complicated.

In DE-A 1 425 429 a high-vacuum seal in particular for valves is described, which in particular deals with the problems of cold welding on valve surfaces of vacuum pumps. As proposed, a high-vacuum seal should be created, in which on the one hand the irregularities of the sealing surface, which are left even after the best surface treatment, should be closed without the materials of the sealing element being welded to each other. A particular shape or arrangement of the seal is not proposed here (except for a preferably conical formation of the sealing surfaces).

According to the prior art discussed above, O-ring arrangement with helium leakage rates of not more than $<10^{-6}$ mbar/s have been achieved. However, as compared to the current scientific and technical requirements, this is no longer sufficient. Today, leakage rates of less than $10^{-10}$ mbar/s in part are required.

Therefore, it was the object of the invention according to EP 07 019 555.7 to manufacture sealing arrangements to be manufactured in an uncomplicated and inexpensive way with very much better leakage rates possibly even below the detection limit of commercially available helium leak detecting devices (about $<10^{-11}$ mbar/s).

For gas seals, based on the prior art, one had to fall back on the known favorable properties of correspondingly suitable soft metal compositions or stable plastics such as highly fluorinated hydrocarbons.

The solution of the object was based on the surprising discovery that the sealing material used between flat sealing surfaces such as in flanges with smooth surfaces in the form of a flat ring with rectangular cross-section is distributed under pressure with respect to the distribution in the cross-section such that it radially "flows" to the outside and undergoes a permanent plastic deformation. Hence it can be concluded that materials exhibiting an elastic behavior under the pressing conditions are less suitable. Elastic materials withstand a deformation. Under extreme pressure, plastic materials however flow into existing depressions of the sealing surface and completely fill the same permanently. Under high pressure, the outside diameter of the sealing ring now grows to a relatively greater extent than the inside diameter. Thus, the volume of the sealing ring rectangular in cross-section and lying flat on a planar surface is changed under the pressure of a plunger such that a greater part of the sealing compound is shifted radially to the outside than could have been expected by a geometrically uniform distribution. This effect of the radial flow of the sealing compound to the outside has already been utilized by the teaching of the above-mentioned EP application, in that the otherwise smooth flow of the sealing material is obstructed by oppositely directed stair-like steps between the bearing surfaces such that at the perpendicular blocking surfaces formed by the stairs an unexpectedly high pressure is built up, which in turn greatly increases the effectiveness of the sealing material.

This also results in the knowledge that the substantial sealing by the measures in accordance with the invention surprisingly does not occur at the plunger surfaces, but at those surfaces which are parallel to the direction of the actual pressing pressure and perpendicular to the plunger and flange planes. Hence it follows that the sealing of the space between opposed flange planes regarded as the only important sealing according to the known prior art only is of secondary importance. In application of this knowledge, the demands as to the smoothness of the surfaces of the sealing elements surprisingly are greatly reduced, and additional surface treatment agents, such as fats, oils, silicones or similar lubricants, are not required either to achieve the desired tightness.

Tests have shown that due to the above-described configuration of sealing elements an improvement of the sealing properties, which so far has hardly been deemed to be possible, can be achieved in particular for highly volatile gases such as hydrogen or helium. As compared to usual helium leakage rates ($10^{-6}$ mbar/s), this seal has provided an improvement to between $10^{-9}$ mbar/s and $10^{-12}$ mbar/s. Especially zinc, lead, indium, gold and further soft metals such as copper and aluminum are useful as sealing material. Correspondingly soft alloys of metals can also be used. The metals and alloys should have a Mohs hardness between 1 and 3, preferably between 2 and 3, it is particularly important that with a closed seal the opposed flanges mechanically contact each other in a frictional manner and thus firmly rest against each other. This ensures that the seal itself is completely kept free of forces acting from outside, which can greatly deteriorate the sealing quality.

SUMMARY OF THE INVENTION

In one aspect of the invention a flange connection for connecting e.g., two sections of a tube or pipe comprises two flanges and a sealing ring inserted into an annular sealing space defined by radial faces and axially extending peripheral walls between the flanges. The sealing ring has an annular main body and an outer periphery with a cross-sectional shape that has legs extending outwardly from the main body. These legs, in a condition prior to application of sealing pressure, are inclined away from each other and have rounded outer ends that abut both the radial faces and the peripheral walls defining the annular sealing space. The legs, in a condition where the flanges are forced against each other, are axially compressed and upset at least in a radial direction by plastic flow of material on the outer ends in sealing engagement with the axially extending peripheral walls. Preferably, the sealing ring is formed with an annular shoulder that extends radially outwardly from an outer peripheral area of the main body and that is centrally located between the legs.

It has been found that by means of a particular design of sealing ring and flanges an even better, almost absolute tightness can be achieved. Surprisingly, it has also been found that steel, an actually outermost elastic material, assumes plastic properties under extremely great pressure, which due to the pressure-related material flow allow to provide steel fittings with seals likewise made of steel.

In this way, homogeneity of flange and sealing material can be achieved while improving the sealing properties at the same time. This possibility so far has not even be taken into consideration by the experts, as up to now it has been regarded as an unwritten law that flange seals must be softer and more deformable than the flange material to be sealed. Following the above-mentioned EP application, the principle of the uneven material distribution in an O-ring under pressure has been utilized here as well. The material closure effective for sealing at the inner surfaces of the sealing space between the flanges, which are positioned approximately perpendicularly to the pressing pressure, is utilized here as well.

The sealing ring can be described as having an annular main body with a radial wedge-shaped indentation around its outer circumference, the indentation defining legs that diverge outwardly. At its outer edge, the sealing ring thus has a uniform Y-shape and thus is given a shape which resembles a wheel rim.

This invention thus provides a novel sealing system for flange connections. The legs of the wedge-shaped cutout in the periphery of the sealing ring are deformed during the sealing operation, when they are compressed, with the diameter and circumference of the ring being increased by plastic deformation and flow of material. With an extremely high pressure acting on the sealing ring, the expansion of the ring results in contacting the inner walls of the sealing space between the flanges, which ultimately effects a virtually absolute sealing also against helium and hydrogen.

BRIEF DESCRIPTION OF THE DRAWINGS

The invention will now be described in greater detail with reference to the accompanying drawings, in which.

DESCRIPTION OF PREFERRED EMBODIMENTS

Figures 1A, 1B:
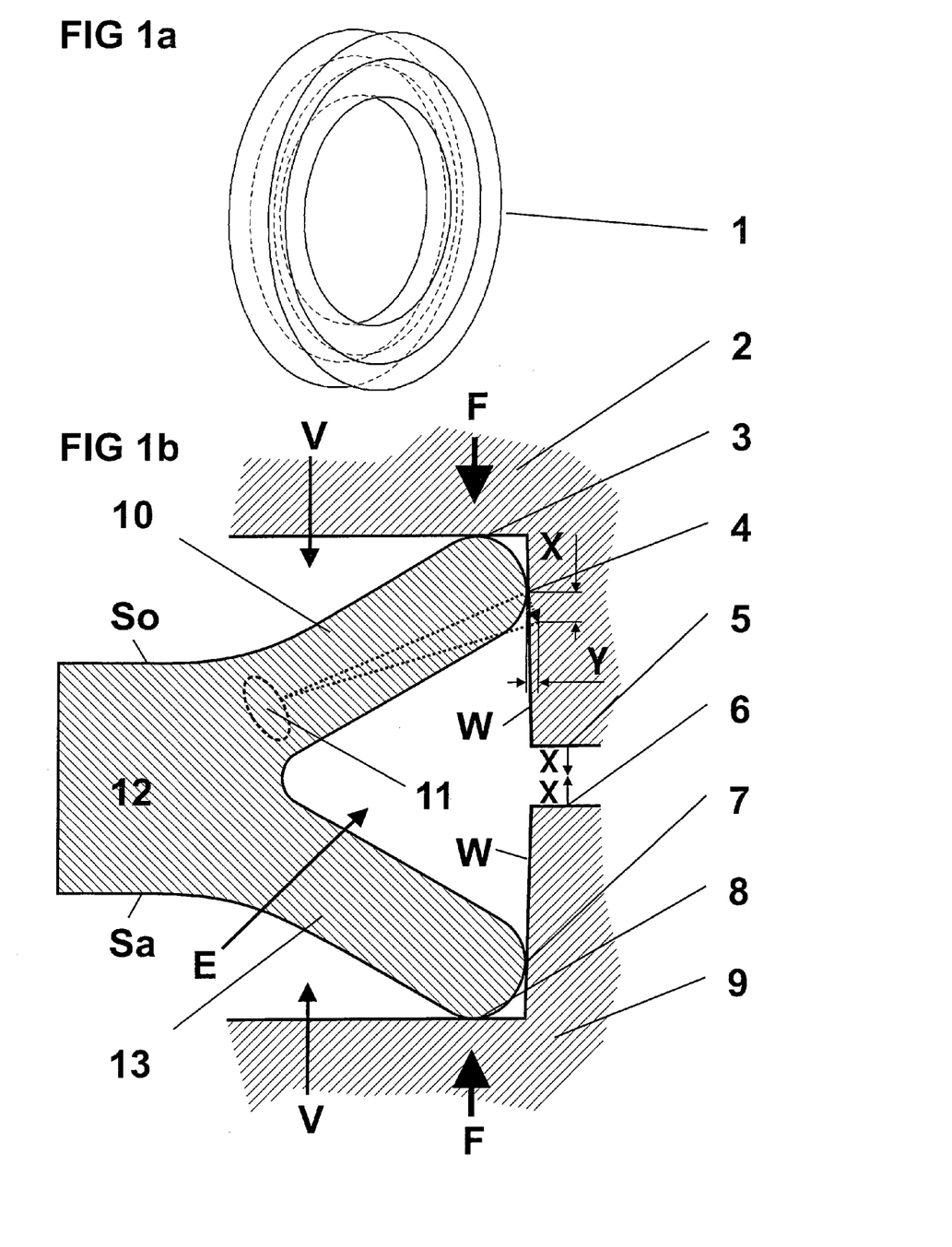
FIGS. 1a-1d illustrate the function and mode of operation of the expansion seal.
Figure 1C:
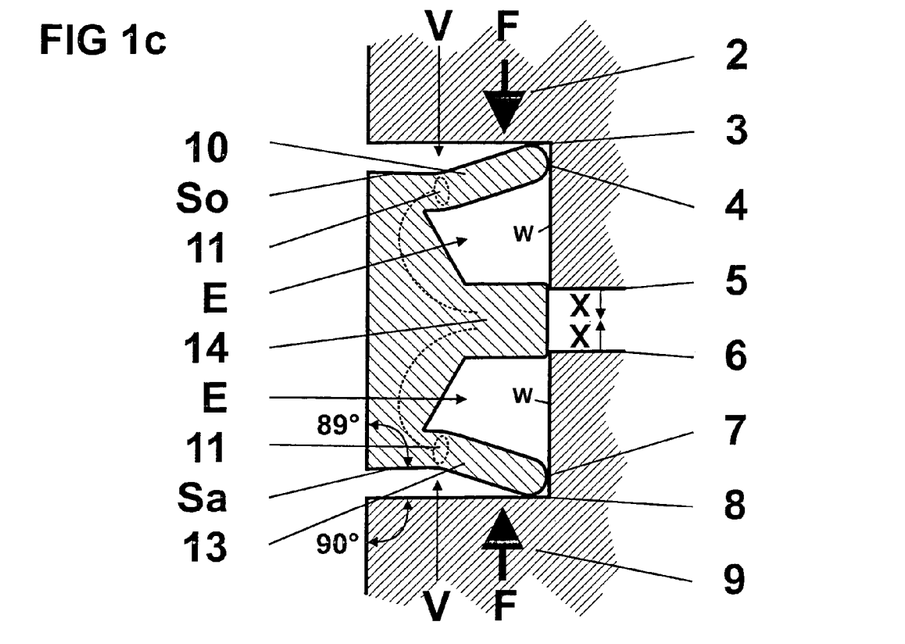
Figure 1D:
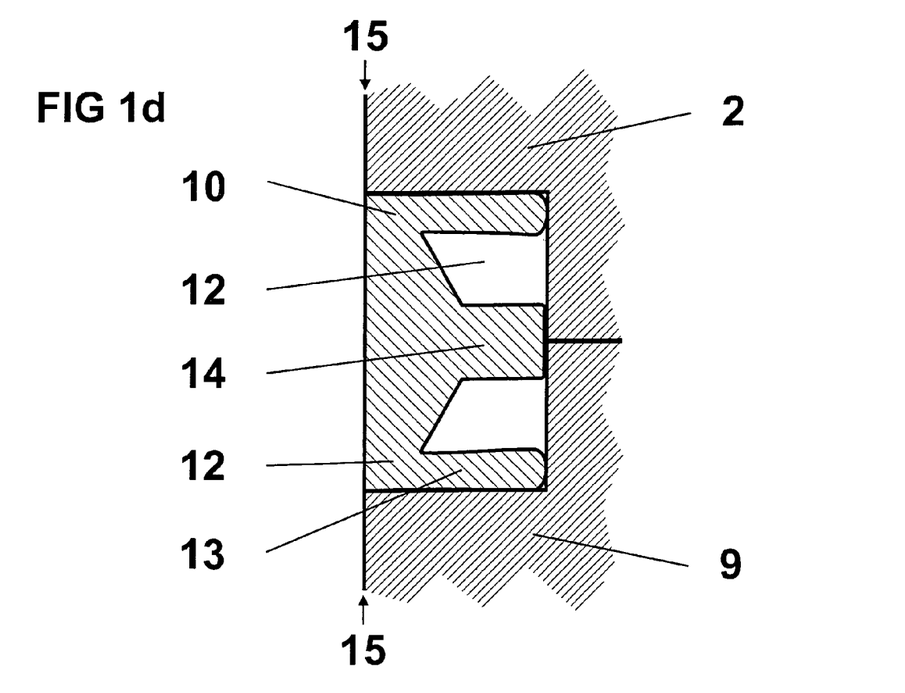

A sealing ring as schematically shown in FIG. 1 is shaped like a wheel rim. A Y-shaped indentation (E) is shown in section in particular in FIGS. 1b-1d.

What turned out to be particularly favorable according to FIG. 1a is an arrangement of the legs (10+13) protruding beyond the thickness of the seal in the inner zone, in which before the pressing operation the axes of the legs form an angle of about 45° with the inner wall (W) of the flange. This arrangement is particularly preferred, because the forces produced during the pressing operation thereby are uniformly distributed over the two legs and thus form two sealing zones perpendicular to each other, which together achieve a particularly good tightness. In this case, the two disks corresponding to the legs of FIG. 1b are positioned at an angle of 90° with respect to each other before pressing.

A non-rotatable flange connection for better handling is achieved in that before the pressing operation the clearance designated with xx in FIG. 1b is disposed asymmetrically, i.e., on each semicircle of the circumference at a different height.

Figure 3:
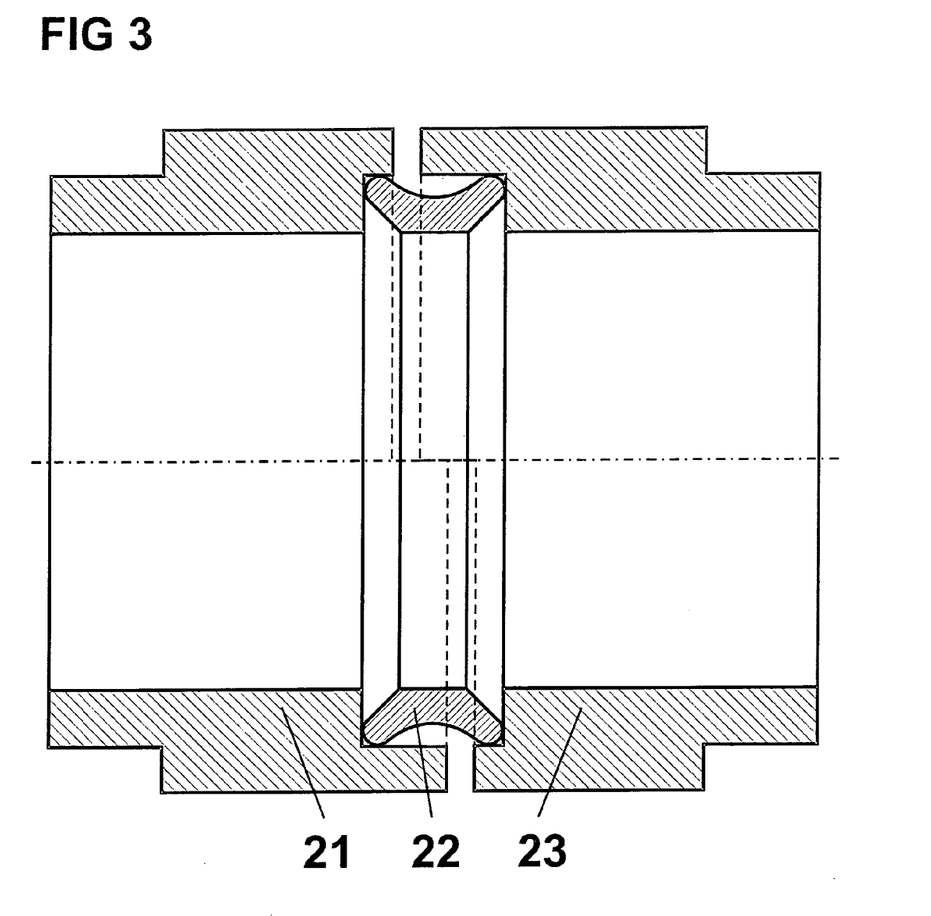
FIG. 3 shows the expansion seal secured against rotation prior to pressing.

An arrangement with a series of stepped partial circles is shown in FIG. 3 in cross-section.

If one considers the movement of the legs (10+13) as a vector moving around the stationary origin (11), the compression results in the horizontal vector components being shortened and the vertical vector components being lengthened.

As described above, this effect forms the basis of the extraordinary sealing effect achieved. In other words, this is achieved in that the components to be sealed prevent the leg ends (4+7) from being displaced vertically. Being stationary at the top and at the bottom with respect to a vertical expansion, the legs thus are upset at the points of contact (4+7) with the flanges (2+9). The upsetting force involved accounts for the enormous sealing force of the construction.

In tests, this sealing principle has been realized homogeneously in stainless steel, by way of example, as a pipe system with sealing flanges. The resulting gas permeability was found to lie far below the reliable detection limit of $<10^{-11}$ mbar/s of commercially available helium leak detectors.

All further properties of the seal made of the material of the pipe conduit were not changed by the sealing operation. An advantage of the material homogeneity of flange and sealant not achievable so far consists in the corrosion resistance of the sealing region, in which no more local elements can form, which always are exposed to an increased corrosion.

Embodiments of the invention thus are preferred, in which seals and flanges are made of the same or at least of a very similar metal, in particular normal steel or high-grade steel.

The space between the legs (10+13) and the flange planes (2+9) designated with V in FIGS. 1b to 1d is of major importance. After sealing, this space should have a rather low residual volume in which the changes of the composition of the medium to be sealed might be retained. The residues of the medium retained there are "flushed out" with a delay, so that these residues might have a contaminating effect. This is particularly important for pharmaceutical or analytical plants. According to FIGS. 2a and 2b it is easily possible by means of a skillful arrangement and shaping of the legs (10+13) to virtually completely eliminate this undesired effect. This is shown particularly clearly in FIG. 1d.

The manufacture of the seals in accordance with the invention is effected in a known manner by cutting or turning corresponding solid base bodies. Since apart from the insertion of the seal no further assembly work is necessary, the system is very economic.

The subject-matter of the invention thus is an O-ring-like seal of solid flat sealing material, which around the entire outer circumference of the ring parallel to its upper (So) and lower (Sa) surface has a wedge-shaped indentation (E) with a V-profile, so that a cross-section extending perpendicularly to said surfaces centrally from the outside to the inside through the seal has the shape of a lying Y whose expanded legs protrude beyond the thickness of the inner ring zone at least at the outer edge of the seal.

A further subject-matter of the present invention is an O-ring-like expansion seal (1) of solid flat sealing material, which around its outer circumference parallel to the upper (So) and lower (Sa) surface of the seal has a wedge-shaped indentation (E) with a V-profile, so that a cross-section extending perpendicularly to said surfaces from the outside to the inside through the seal, with reference to a zone of the seal, has the shape of a lying Y.

A further subject-matter of the invention is a sealing device for pipes, which contains at least two flanges (2, 9) with corresponding sealing surfaces, which are arranged around the pipe ends to be connected and can be connected with each other flat perpendicular to the pipe axis, and between the sealing surfaces in a depression (V) of the flange plane with approximately perpendicular inner walls (W), which is provided around the inner edge of the flanges, at least one O-ring-like seal (12) arranged planar around the pipe passage, which is characterized in that the seal can accurately be inserted into the depressions (V) of the flanges and has a wedge-shaped indentation (E) around its entire outer circumference. When reducing the distance of the upper (So) from the lower (Su) sealing surface by perpendicular application of pressure (F) onto the seal (3, 8) a high radial sealing pressure is generated at the contact zones (3, 4, 7, 8), because the expansion of the seal towards the edge thereof is prevented by the approximately perpendicularly positioned inner wall (W). Furthermore, it was discovered that the principle of the invention surprisingly also provides for quite a considerable progress as regards the sealing of end pipes of containers, e.g., of bottle closures, in particular on wine, liquor, champagne or sparkling-wine bottles, where it is particularly important that closure material getting in contact with the liquid is absolutely taste-neutral in particular over extended periods and that it is ensured that there is a rather absolute sealing of the contents against the atmospheric oxygen surrounding the bottle.

As described already in WO 2006/089711 A1, tin sheet as a boundary surface was found to be particularly neutral and flexible, but it is known that its use together with cork as a core material in bottles is difficult, because when closing the bottle tin-coated corks tend to become leaky as a result of cracks obtained in the tin foil during closure.

This disadvantage is avoided by the design of the cork seal in accordance with the invention.

Turning again to the figures, FIG. 1a shows a schematic three-dimensional representation of the expansion sealing ring. The function and mode of operation will be explained with reference to the drawings 1a, 1b, 1c and 1d. The sealing ring has legs (10+13) expanded in a wedge-shaped manner, starting from a common annular main body (12).

The sealing ring is shown in a preassembled condition between adjoining sealing flanges (2, 9) which define an annular sealing space with radial faces and axially extending peripheral walls or boundary surfaces W. The sealing ring initially rests against outer points (3+8) unpressed and at the same time is centered at the points (4+7) by the boundary surfaces (W) arranged perpendicular thereto, wherein the outside diameter of the two legs (10+13) and the inside diameters of the last-mentioned flange surfaces are dimensioned as a clearance fit.

By action of the forces indicated by (F), the flanges move towards each other during the sealing operation, until they come into abutment at the end faces (5+6). The distance covered amounts to 2 times X, and during movement of the legs (10+13) about the stationary origin (11) [the same is only shown at the leg (10)] it results in the fact that the legs (10+13) are upset by the indicated distance (Y) between the tangential contact points (4+7) and the stationary origin (11). As a result of this upsetting effect, the sealing force is obtained at the sealing points of the points (4+7) contacting each other. In addition, a further sealing point is obtained at the contact points (3+8) as a result of the pressing force (F).

Here, the sealing ends of the legs (10+13)—which in practice are disks—have a circular or quasi circular cross-section. Induced by the illustrated sealing forces, they provide the smallest surface deformation at the sealing points. Investigation reveals changes caused by material flow in the microscopic range, which have a surface-smoothing effect on the flat flange surfaces and thus create the prerequisite for an ideal sealing.

In a rotationally symmetric arrangement, the stationary origin [region (11)] can be configured in a very material-saving way, since the material flow of the legs (10+13) caused by the illustrated upsetting force chiefly acts in the direction of the sealing surfaces and is statically supported particularly well due to the vault effect of the region (12).

The deformation of the expansion seal is irreversible in so far as after disassembly of the flanges new seals must be inserted during reassembly.

For better disassembly of the "same-metal seal" (i.e., seal and flanges are made of the same material) after separating the connection, the flange surfaces can be provided with a small inclination at the sealing points (4+7) in the direction of the flange end faces (5+6).

FIGS. 1c and 1d show a variant of FIG. 1a. The variant differs by an additional, centrally arranged annular shoulder or ring (14), which statically further improves the seal by forming further pressure-stabilizing bridge arches to the legs (10+13). It was found that the seals are subject to a considerable pressure load generated by the pressing operation around the regions indicated in broken lines in FIG. 1c [stationary origin (11)]. The central shoulder or ring (14) assists the uniform distribution of the forces to the points 4+7 and thus further improves the sealing capability of the system. As can be taken from FIG. 1d, the undesired volume V also has virtually disappeared after the pressing operation. Even in the critical region of the seal, the inner wall (15) of the flange thus not only is homogeneous with respect to the material used, but also continuous with the sealing ring and thus smooth and free of flow-impeding protrusions or depressions of the flange wall.

Figure 2:
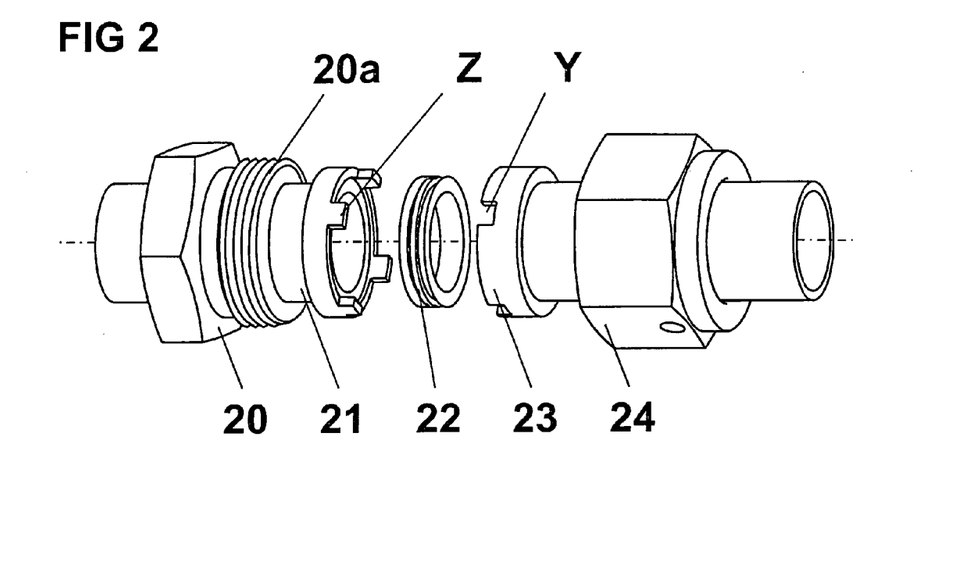
FIGS. 2, 2a, and 2b illustrate the practical realization of a flange seal.

FIG. 2 shows a practical implementation of the sealing connection where the flanges are secured against relative rotation by inter-engaging denticulation Z, Y, and in which the seal (22) can be compressed by means of the hollow nut (24) to be screwed onto the thread (20a) (cf. also FIG. 3).

Figures 2A, 2B:
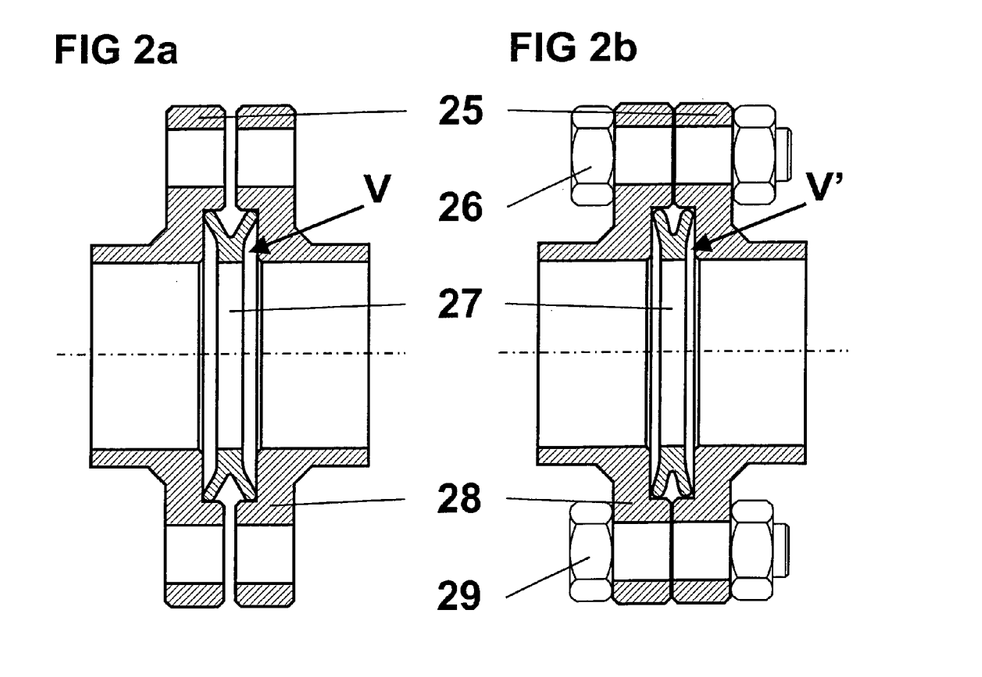

In cross-section, FIGS. 2a and 2b illustrate a likewise non-rotatable implementation which is joined together by means of two or more screw bolts.

The arrangement of a further embodiment with sealing flanges secured against relative rotation is shown in FIG. 3.

The thus connected and sealed flanges surprisingly have a particularly desired and important property. Even under load (violent movement of the pipe system for example caused by machines), they are unexpectedly tight and even under great load hardly reveal deteriorations of the sealing properties. In the case of homogeneity, i.e., with flange and sealing material of the same kind, a stability similar to welded connections can be achieved. This applies to both torsional and bending loads.

Figure 4:
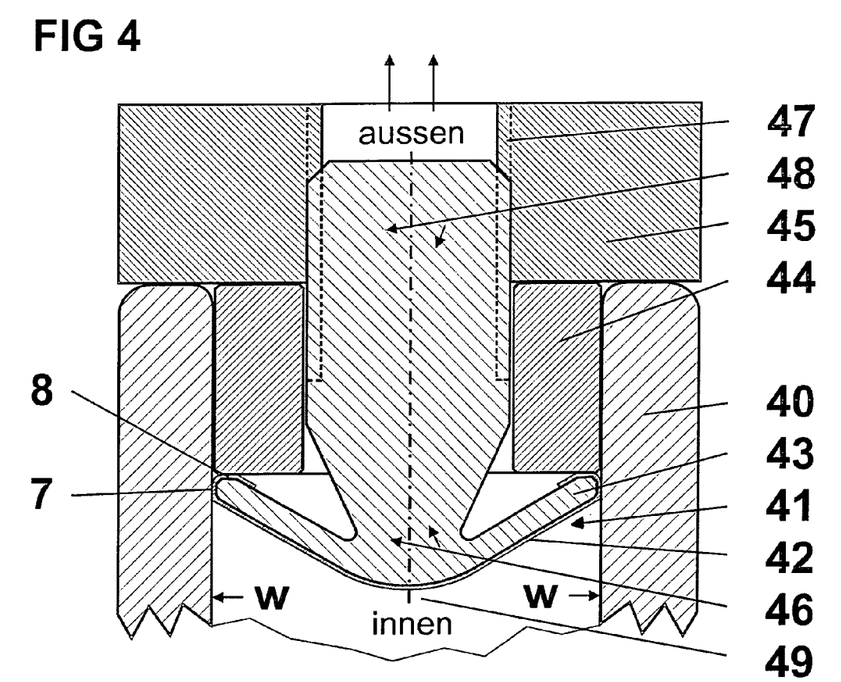
FIGS. 4, 4a, and 4b show a single-leg expansion seal as a bottle closure.
Figure 4A:
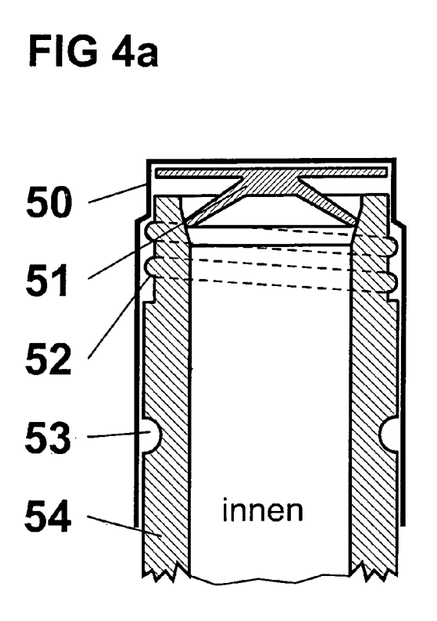
Figure 4B:
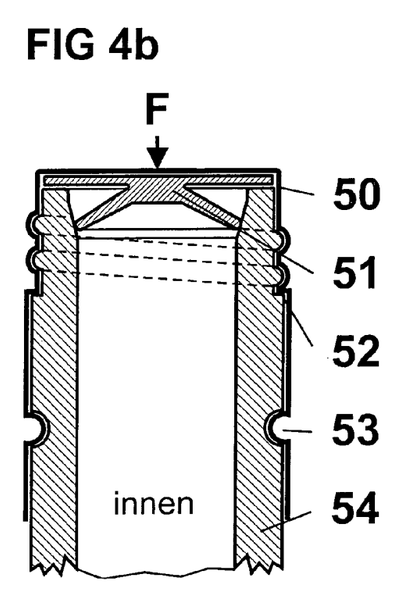

The closure system for bottles modified in accordance with the invention is shown in FIG. 4 and in FIGS. 4a and 4b. These figures illustrate that also only one leg of the Y cross-section shown in FIGS. 1 to 3 can be used, if during closure mechanical pressure can be exerted on the contact points (7) and (8) shown in particular in FIG. 1b against the bottle neck (40) or the spacer ring (44) as a vertical cavity boundary (W). The bottle neck (49) normally made of glass forms the cavity (41) to be sealed. The closure consists of the parts (45), (46/48) [including the diffusion barrier (42)] and a spacer ring (44) which at the same time serves as anti-rotation lock. The part [of the component (48)] formed of the two legs (43), which forms said vault and in section represents a "mushroom", has a slightly smaller diameter in the unbraced condition than the cavity (41), so that before closing the pipe it can be inserted into the bottle neck virtually without friction with the inner glass surface (W), whereby a damage of the diffusion barrier (42) is excluded.

For closing, the completely preassembled closure system is pushed into the bottle neck. The slightly elastic spacer ring (44) serves as a guide. Its larger outside diameter, based on the inside diameter of the bottle neck, is slightly reduced during insertion. This results in an inhibition of rotation, which will be used later on when generating the pressing force by tightening the nut (45).

The closure nut (45) with its internal thread (47) engages in the correspondingly fitting counter-thread of the base body (48) of the plug. When rotating the nut (45), the plug in the cavity still present now is moved outwards by means of the thread in the direction indicated by the two arrows, whereby via the mushroom head (46) the mushroom edge (41) is pressed with great force against the spacer ring (44) and with even greater force onto the wall (W) of the bottle neck. For the first time a virtually absolutely tight and taste-neutral, safe closure in particular of high-quality wine and champagne bottles thus can be produced and be manufactured at particularly low cost since the material used for the parts of the closure (such as polypropylene, polyethylene, polystyrene or polyamide, preferably polyethylene terephthalate) is uncritical in terms of its properties, as with an uninjured diffusion barrier it can exert no influence on the taste of the contents of a bottle closed in this way. As material for the plug parts (45, 46/48) and the spacer ring (44), every flexible, but sufficiently hard material hence can be used, which can withstand the forces occurring during the application (at 46) and in the thread (at 47) without undesired further deformation and maintains its flexibility over a correspondingly long period. Despite its extremely firm seat only due to friction and without wire reinforcement, the closure can surprisingly easily be opened again by few revolutions of the closure nut.

If the closure nut (45) is designed in a manner known from other closures such that it can easily be held and moved between finger and thumb (coarse or fine corrugation or lever engagement), it is quite particularly useful for sparkling-wine or champagne bottles, which are known to be awkward to uncork because of the high internal pressure in the bottle neck, since removing the arresting wires of champagne bottles very often leads to undesired bubbling over. Since high-quality natural cork is getting more and more expensive, the bottle closure of the invention represents a considerable progress in this field also in terms of costs. For better handling of the closure nut (45) during opening, the edge thereof thus is designed irregular such that easy-to-grasp holding surfaces are formed for thumb and index finger, which facilitate rotating the nut.

Therefore, the invention furthermore comprises an expansion seal for end pipes of a vessel, in particular bottle necks, in the form of a multi-part plug-like closure with a mushroom-like end corresponding to the diameter of the pipe to be sealed and with its bulge directed towards the liquid, and a tapered base body (48) extending in the opposite direction, whose longitudinal axis coincides with the longitudinal axis of the pipe end or bottle neck, and with a spacer ring (44) with an outside diameter corresponding to the lumen of the pipe end or bottle neck and an inside diameter corresponding to the diameter of the tapered base body (48), and with a closure nut (45) whose thread diameter corresponds to the inside diameter of the spacer ring (44) and to the outside diameter of the tapered base body (48), and whose outside diameter is dimensioned such that the inwardly facing bearing surface of the closure nut comes to lie on the edge of the pipe to be sealed, wherein the thread engages in a counter-thread of the base body enclosed by the spacer ring (44) such that with a corresponding rotation of the closure nut (45) a tensile force indicated in FIG. 4 by two arrows directed to the outside is generated on the mushroom-like end (46) towards the outside, which increases the pressure of its edge zone (43) both onto the inner surface of the pipe or bottle neck (W) and onto the lower surface of the spacer ring (44). Practically, the mushroom-like end (46) extending into the tapered base body together with the spacer ring (44) and the closure nut (45), which before closing still sits loosely on the thread of the base body, are inserted into the pipe end or the bottle neck as a preassembled closure unit, whereupon by rotating the nut the final closure can be achieved at (7) due to the resulting expansion pressure of the mushroom.

If desired, the surface of the inwardly facing "mushroom" is coated with a diffusion barrier (42) preferably made of tin foil, such that liquid present in the container cannot get in contact with the sealing material of the plug.

Of course, the effect of the thread generating a sealing force can also be replaced by other known and suitable devices, as far as the same can generate and maintain the decisive pressure on the mushroom-like end of the sealing point (7).

An example for this is shown in FIGS. 4a and 4b.

The expansion ring seal is employed in the screw cap of e.g., wine bottles, which is increasingly used today. For this purpose, a "mushroom" (51) is produced, which opens into a round plate. The "mushroom shape" is the negative image of the shape of FIG. 4. Hence it is possible to apply the sealing force onto the system from outside (FIG. 4b [F]).

In the present state of the art, a flat seal is inserted in the bottom of the metal foil cup (50). During the closing operation, it is pressed onto the bottle mouth (54) together with the foil cup by means of a tool. The lasting effect of the sealing force is achieved by subsequently curling the foil cup into the external thread (52) applied onto the bottle neck and the flute (53) formed at the bottle neck (54).

The sealing effect of the "mushroom" (51) inserted into the foil cup instead of the flat seal is achieved by a shoulder or by a cone increasing towards the bottle mouth. During the pressing operation, the mushroom edge stops at the shoulder in the bottle mouth, or in the case of equal size of mushroom edge outside diameter and bottle neck inside diameter, and the sealing operation described above in detail is obtained.

The sealing effect of the bottle closures described in FIGS. 4, 4a and 4b is exclusively based on the principle of the expansion seal. Here as well, the described solutions lead to a development of sealing force which at the "mushroom edge" reaches a magnitude which exceeds the strength range of the "mushroom material" and hence lies outside the range of application of Hooke's law. There is a flow of material at the sealing point (7), which in turn leads to the very reproducible sealing effect of the sealing principle.

Another feature to be emphasized of the described bottle seal is based on the sealing effect which is generated in the "interior" of the bottle neck. In conventional screw caps, the sealing point is located "on the outside", at the end of the bottle neck. This "external point" can very easily be injured during the manufacture of bottles, the cleaning of bottles and the transport thereof and thereby lead to leakages of the closure.

This is even true for a properly manufactured screw cap, which is injured due to subsequent pressure on the "external" sealing point and becomes leaky as a result.

Although the invention has been described hereinabove with reference to a specific embodiment, it is not limited to this embodiment and no doubt further alternatives will occur to the skilled person that lie within the scope of the invention as claimed.

The invention claimed is:

1. A flange connection comprising:
two flanges and a sealing ring inserted into an annular sealing space defined by radial faces and axially extending peripheral walls between the flanges;
wherein the two flanges and the sealing ring are comprised of the same material:
the sealing ring having an annular main body and an outer periphery with a cross-sectional shape that has legs extending outwardly from said main body;
wherein the legs, in a condition prior to application of sealing pressure, are inclined away from each other and have rounded outer ends that abut both the radial faces and the axially extending peripheral walls defining the annular sealing space;
wherein the legs, in a condition where the flanges are forced against each other, are axially compressed and upset at least in a radial direction by plastic flow of material on said rounded outer ends, wherein the rounded outer ends each are in sealing engagement with a first sealing point at a first contact zone with said axially extending peripheral walls and with a second sealing point at a second contact zone at one of the radial faces, respectively, wherein a free space remains between said first and second sealing points of the rounded outer ends, respectively, and in the free space the rounded outer ends have no contact with the radial faces and the axially extending peripheral walls.

2. A flange connection in accordance with claim 1, wherein the sealing ring and the flanges both consist of steel.

3. A flange connection in accordance with claim 1, wherein the flanges have inter-engaging structures preventing relative rotation.

4. A flange connection in accordance with claim 1, wherein the legs are inclined away from each other at an angle of 70 degrees to 100 degrees relative to each other.

5. Mange connection in accordance with claim 4, wherein the legs are inclined away from each other at an angle of 90 degrees relative to each other.

6. A flange connection comprising two flanges and a sealing ring inserted into an annular sealing space defined by radial faces and axially extending peripheral walls between the flanges, the sealing ring having an annular main body and an outer periphery with a cross-sectional shape that has legs extending outwardly from said main body and which, in a condition prior to application of sealing pressure, are inclined away from each other and have rounded outer ends that abut both the radial faces and the peripheral walls defining the annular sealing space, and which in a condition where the flanges are forced against each other, are axially compressed and upset at least in a radial direction by plastic flow of material on said outer ends in sealing engagement with said axially extending peripheral walls wherein the sealing ring is formed with an annular shoulder that extends radially outwardly from an outer peripheral area of said main body and that is centrally located between said legs.

7. A flange connection in accordance with claim 6, wherein the sealing ring in the condition where the flanges are forced against each other is plastically deformed so as to have radial annular sealing faces partially formed by said legs and partially formed by said main body, and said sealing faces sealingly engage said radial faces of said annular sealing space without leaving substantial gaps.

* * * * *